(12) United States Patent
Foos et al.

(10) Patent No.: US 6,719,139 B1
(45) Date of Patent: Apr. 13, 2004

(54) ANTIPILFERAGE PACKAGE AND METHOD FOR MAKING SAME

(75) Inventors: Douglas E. Foos, Barrington Hills, IL (US); Richard L. Partlow, Jr., Naperville, IL (US)

(73) Assignee: Plastofilm Industries, Inc., Wheaton, IL (US)

( * ) Notice: Subject to any disclaimer, the term of this patent is extended or adjusted under 35 U.S.C. 154(b) by 0 days.

(21) Appl. No.: 09/491,270

(22) Filed: Jan. 26, 2000

(51) Int. Cl.[7] ............................................. B65D 73/00
(52) U.S. Cl. ..................................................... 206/462
(58) Field of Search ................................ 206/461, 462, 206/471, 807

(56) References Cited

U.S. PATENT DOCUMENTS

| | | | |
|---|---|---|---|
| 3,129,817 A | * | 4/1964 | Rohdin ......................... 206/462 |
| 3,144,343 A | | 8/1964 | Fritsche |
| 3,487,915 A | | 1/1970 | Scott |
| 3,809,221 A | | 5/1974 | Compere |
| 4,168,002 A | | 9/1979 | Crosby |
| 4,485,920 A | * | 12/1984 | Skylvik ....................... 206/468 |
| D295,833 S | | 5/1988 | Roth |
| 4,804,984 A | * | 2/1989 | Heuer et al. .............. 206/316.2 |
| 4,842,141 A | * | 6/1989 | Segal .......................... 206/462 |
| D308,485 S | | 6/1990 | Yeske |
| 5,029,705 A | * | 7/1991 | Schmidt et al. ............. 206/705 |
| D327,844 S | | 7/1992 | Wimbish et al. |
| 5,297,672 A | | 3/1994 | MacTavish |
| D353,092 S | | 12/1994 | Green |
| 5,377,836 A | * | 1/1995 | Eisenbraun .................. 206/461 |
| 5,586,657 A | | 12/1996 | Ward et al. |
| 5,607,101 A | * | 3/1997 | Saito ............................ 229/71 |
| 5,626,226 A | | 5/1997 | Gardiner et al. |
| 5,735,404 A | * | 4/1998 | Kumakura et al. ......... 206/469 |
| 5,788,105 A | * | 8/1998 | Foos ........................... 220/266 |
| 5,896,991 A | | 4/1999 | Hippely et al. |
| D412,631 S | | 8/1999 | Green |
| 5,979,662 A | | 11/1999 | Green |

* cited by examiner

Primary Examiner—Mickey Yu
Assistant Examiner—Troy Arnold
(74) Attorney, Agent, or Firm—Tracy D. Beiriger

(57) ABSTRACT

A package for holding an article has a front portion with a sheet generally defining a plane and has an outer rim. The package also has a back portion with an area and an outer periphery. The back portion is configured to be secured to said front portion. An inner opening is defined by the back portion so that the inner opening has an area substantially smaller than the area of the back portion. A separately formed first blister is shaped for defining a first pocket configured for receiving at least a portion of the article. The first blister also has a peripheral edge configured for attachment to the back portion in a region of the inner opening of the back portion.

36 Claims, 7 Drawing Sheets

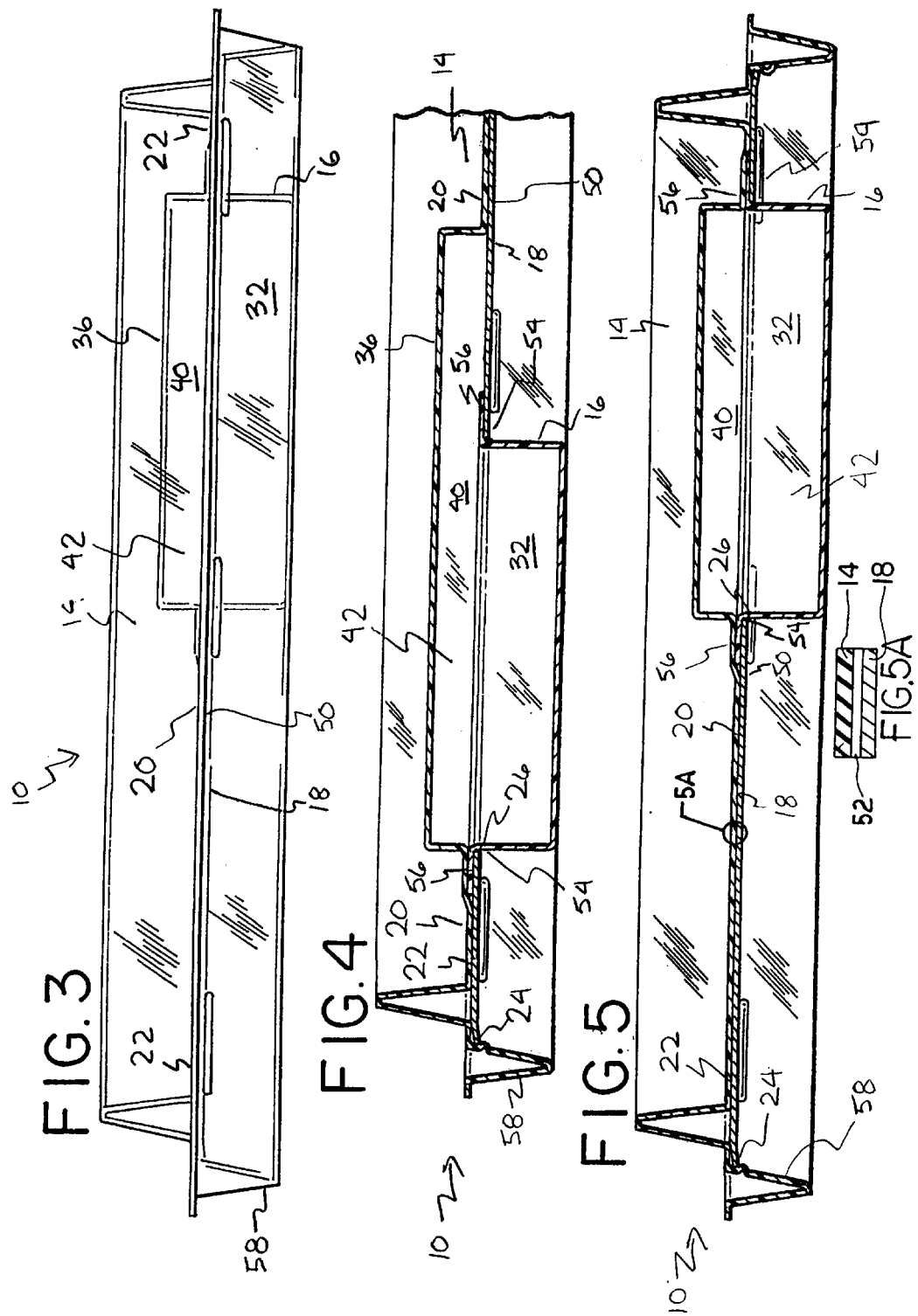

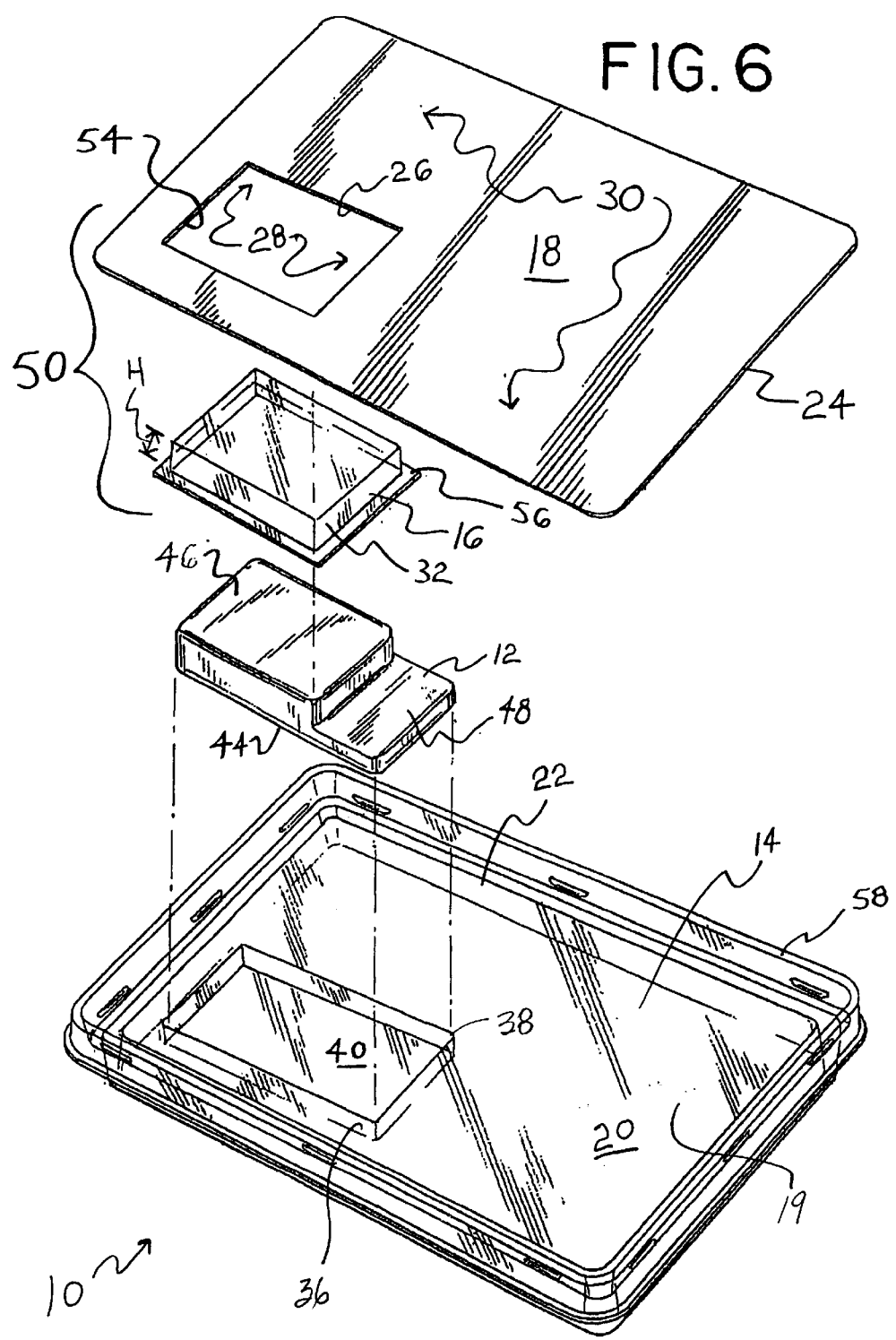

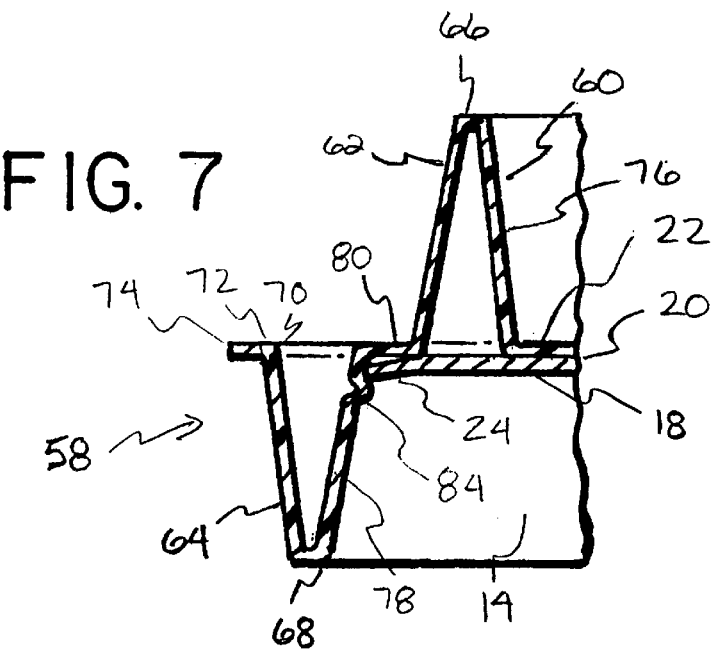
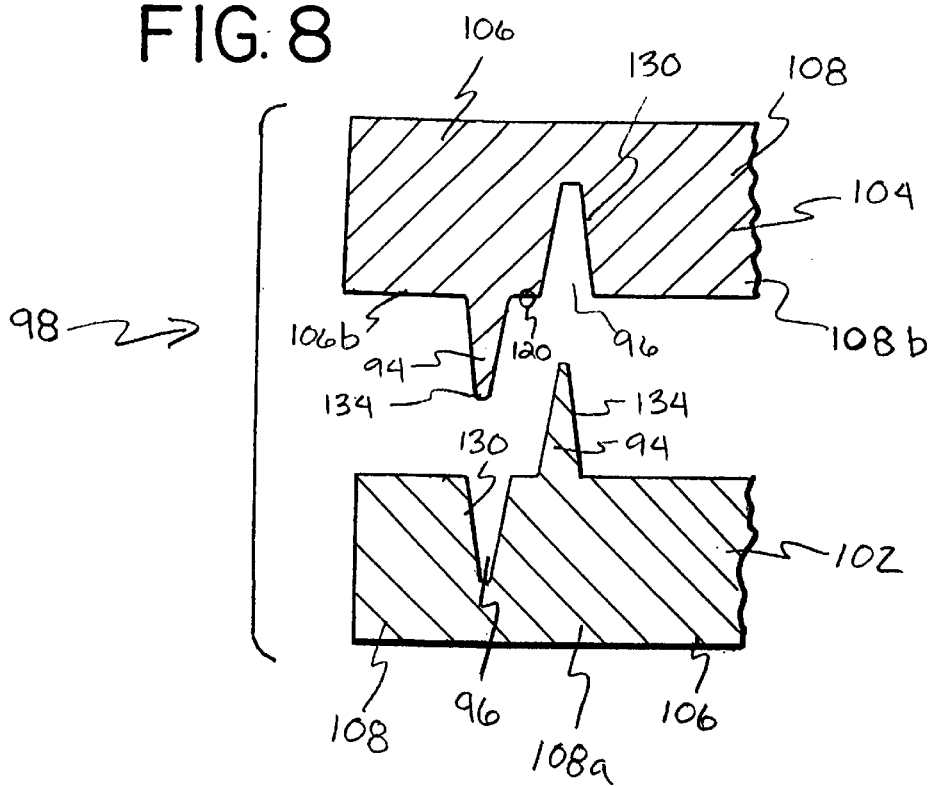

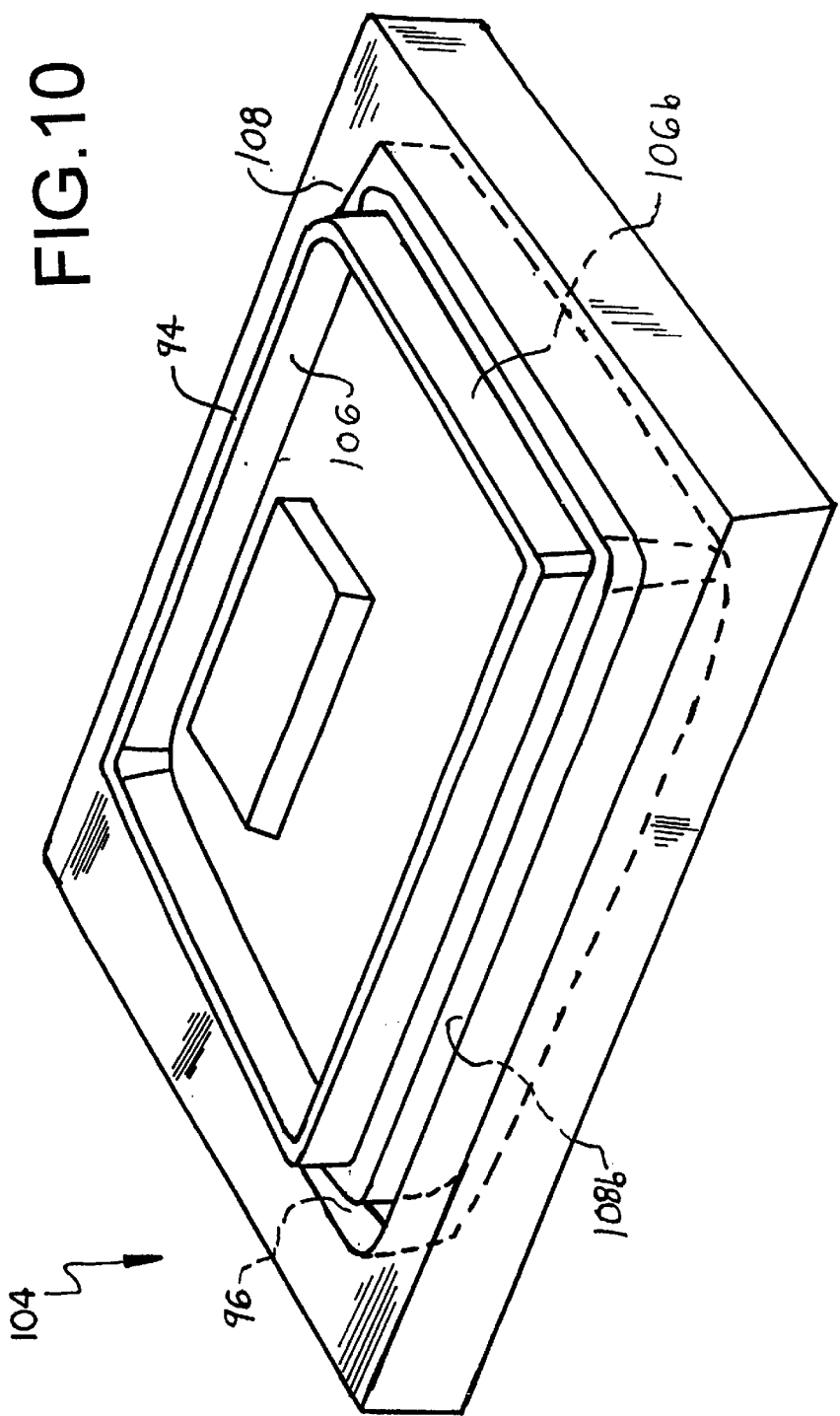

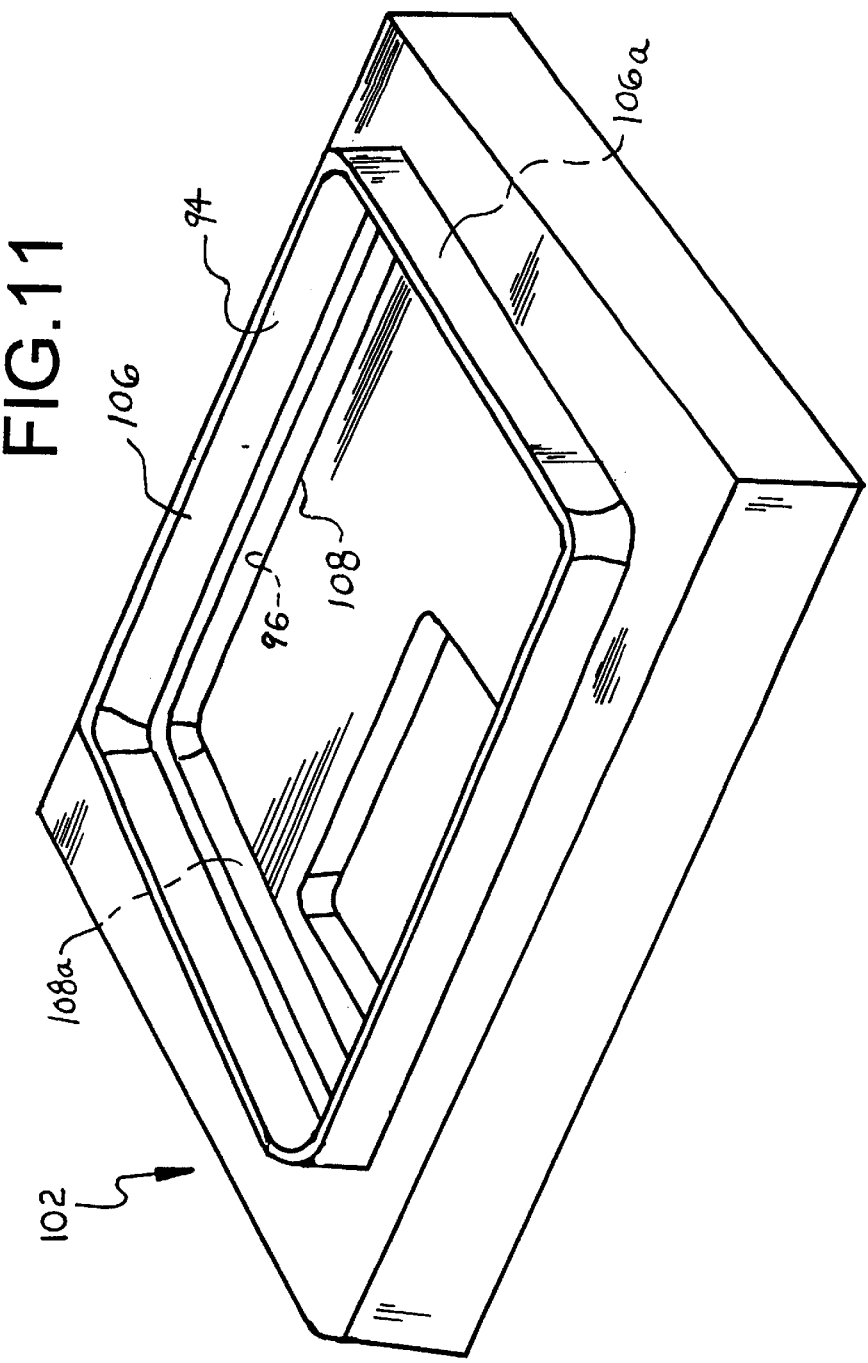

ANTIPILFERAGE PACKAGE AND METHOD FOR MAKING SAME

BACKGROUND

The present invention relates generally to a package for displaying articles accessible to customers in a store, and also which is configured to prevent theft of the article. More particularly, the present invention relates to an inexpensive package that is substantially larger than the packaged article, and is difficult to bend so that the container is not easily hidden from view, and is difficult to open in a store without being detected.

Antipilferage packages are known and used to prevent theft of small articles. Particularly in warehouse or club-type stores, where there are few employees available to monitor customers and prevent shoplifting, such packages are very desirable. These packages typically include a transparent blister to display the article without granting direct access to the article. The packages are also much larger than the article so that it is difficult to hide the packaged article under clothing.

To circumvent these measures, the blisters of conventional packages have been cut to remove the article, or the packages have been folded to hide the entire package within the thief's clothing. To prevent these occurrences, known antipilferage packages frequently are made of two matching plies of a strong transparent plastic, one for the front face and one for the back face, with the article enclosed between the two plies. The blister protrudes from one or both of these faces. Furthermore, a very strong rib or flange is cooperatively formed by joining outer rims of the two plastic plies to render the package practically unbendable by hand. Often, an information card is disposed between the two plies.

Some of the known packages are made by thermoforming to obtain the desired strength and shape needed to resist bending or cutting of the plastic. Thermoforming includes positioning a thermoformable sheet of material on a thermoforming apparatus and then heating it. To form the conventional rib or frame on the package, the sheet of material is typically positioned between a male portion mold and a corresponding female portion assist. The female and male portions are reciprocally movable relative to each other and move together to a "forming" position to matingly engage the male and female portions. This converging of the mating portions bends the material, after it is heated, into the general desired shape. Once the assist and mold enclose the material, the heated and bent material is then pushed by air pressure and pulled by vacuum to position the heated material against the mold and away from the assist to the precise desired position for the material. The air pressure and vacuum enters the cavities through apertures along the assist and mold.

After each ply of material is formed and cut, the article or product is placed between two pieces that become the front and the back of the package. Finally, the peripheral edges of the front and back pieces are RF sealed to each other to form the completed package.

While these known antipilferage packages reduce theft, they require relatively large amounts of thermoforming material and as such are relatively expensive. On the other hand, the two plies of material at the rib cannot easily be eliminated because the strength and security of the package rely on having both plies.

Thus, a main object of the present invention is to provide an improved antipilferage package that is made with less thermoforming material while maintaining a relatively unbendable, strong rib along the outer edge of the package and maintaining the article within the package where it is not easily separated from the package.

Another object of the present invention is to provide an improved antipilferage package that eliminates the need for two plies of thermoformable material at the rib of the package while providing sufficient strength to resist bending by hand.

Yet another object of the present invention is to provide an improved antipilferage package with a non-thermoformable back portion that aids in enclosing the article so that it is difficult to remove the article from the package.

A further object of the present invention is to provide an improved method and apparatus for making an antipilferage package with a rib formed from a single ply of thermoformable material.

SUMMARY OF THE INVENTION

The above-listed objects are met or exceeded by the present antipilferage package. A single sheet of thermoformable material is provided with a corrugated rib for strength. The single sheet has a front side, a back side which provides the attachment point for an information panel or card as well as a separate first blister. Forming the package by attaching the first blister directly to a back portion still maintains a structure that is difficult to open for accessing the enclosed article while eliminating the need for two layers of material.

More specifically, a package for holding an article has a front portion, a back portion and a separately formed first blister. The front portion includes a sheet generally defining a plane and has an outer rim. The back portion has an area and an outer periphery, and is configured to be secured to the front portion. An inner opening is defined by the back portion and has an area substantially smaller than the area of the back portion. In addition, the separately formed first blister is shaped for defining a first pocket configured for receiving at least a portion of the article. A peripheral edge is also formed on the first blister and is configured for attachment to at least one of the front portion and the back portion in a region of the inner opening of the back portion.

Furthermore, features of the present invention also include a rib connected to an outer rim of a sheet. The rib includes an inner wall connected to the outer rim, a middle wall connected to the inner wall at a defined peak, and an outer wall connected to the middle wall at a defined valley, so that the rib is shaped with waves or folds. This configuration provides generally the same amount of strength to a single ply of thermoformable material as two conventional plies or sheets of thermoformable material, when each ply has its own rib and the ribs are attached to each other so that they are positioned in a mirrored fashion to extend in opposite directions to cooperatively form a singularly acting rib.

In more detail, a package has a sheet generally defining a plane and has an outer rim with a rib. The rib includes an inner wall integrally formed with the outer rim. The inner wall extends generally normally relative to the plane from the outer rim in a first direction to a peak. A middle wall is integrally formed with the inner wall and also extends generally normally relative to the plane. The middle wall extends from the peak in a second direction, past the plane and to a valley, where the second direction is generally opposite to the first direction. Additionally, an outer wall, integrally formed with the middle wall, extends generally normally relative to the plane and extends from the valley to a distal end defining a top of the outer wall.

Yet another feature of the present invention includes an improved method and apparatus for forming the improved antipilferage package. In the conventional apparatus for forming an antipilferage package, in a mold set, all molds would be positioned on one side of the sheet of thermoformable material and all assists would be positioned on the opposite side of the sheet. This typical configuration, however, would result in a non-uniform thickness of the sheet throughout the formed rib due to the different characteristics of forming the material against a male mold with an insert and a female mold with a cavity.

However, a more uniform layer of material is formed when the material is forced only against male portion molds while using only female portion assists. This process requires that each male mold, which extends in opposite directions, be treated uniquely by the forces used to move the thermoformable material. In the typical mold set forming the rib on an antipilferage package, no efficient way exists to isolate the male molds from each other for the unique treatment. Thus, the present invention includes a first part and a second part, each having a female portion and a corresponding male portion that define each chamber to connected by a passage that is sealed by a chamber sealing device so that each set of corresponding male portion molds and female portion assists can be treated uniquely.

To be more precise, a method of forming a package having a thermoformable sheet includes the steps of providing a sheet of thermoformable material and providing a molding set having a first part and a corresponding second part, where each of the parts has a male portion and a female portion. Further steps include placing the sheet of thermoformable material between the first part and the second part. The first and second parts cooperatively define at least two thermoforming chambers connected by a passage between the first part and the second part, where one of the thermoforming chambers tapers in a different direction than the other thermoforming chamber.

This method also includes converging the first part and the second part in the presence of heat for shaping the sheet, and sandwiching a chamber sealing device, disposed on one of the parts, and the thermoformable sheet between the first part and the second part along the passage so that air cannot flow through the passage for isolating one thermoforming chamber from the other. Finally, a shaping step includes shaping the sheet by maintaining air flow against the sheet in at least a first direction in one thermoforming chamber and in a second direction in the other thermoforming chamber, the first direction being different than the second direction.

Additionally, another feature of the present invention is an apparatus for forming a package with a thermoformable sheet that includes a first part and a second part that define at least two thermoforming chambers connected by a passage between the first part and the second part. Each part has at least one male portion and one female portion. In addition, at least one thermoforming chamber tapers in a different direction than the other thermoforming chamber. The first and second parts are configured and disposed in opposing locations for converging the first part with the second part for shaping the thermoformable sheet in between the first and second parts.

The apparatus also has a chamber sealing device disposed within the passage and configured for isolating one thermoforming chamber from the other thermoforming chamber so that the converging of the parts sandwiches the sealing device and the sheet between the first and second parts along the passage so that air cannot flow through the passage. Air flow devices are also provided for flowing air against the sheet from at least a first direction in the first chamber and from a second direction different from the first direction in the second chamber.

BRIEF DESCRIPTION OF THE DRAWINGS

FIG. 3 is an assembled side view elevation of the present antipilferage package;

FIG. 4 is a cross-section of the present antipilferage package taken along the line 4—4 of FIG. 1 and in the direction generally indicated;

FIG. 5 is a cross-section of the present antipilferage package taken along the line 5—5 of FIG. 1 and in the direction generally indicated;

FIG. 5A is a close-up view of a portion of the cross section of FIG. 5.

FIG. 6 is an exploded front perspective view of the present antipilferage package;

FIG. 7 is a close up view and cross-section along the line 7—7 of FIG. 1 of another portion of the rim of the present antipilferage package;

FIG. 8 is a simplified cross-sectional view of molds and assists used to form a portion of the present antipilferage package;

FIG. 10 is a top perspective view of a part of a mold set of the apparatus that forms the improved antipilferage package; and FIG. 11 is a top perspective view of an inverted part of a mold set of the apparatus that forms the improved antipilferage package.

DESCRIPTION OF THE PREFERRED EMBODIMENT

Figure 1:
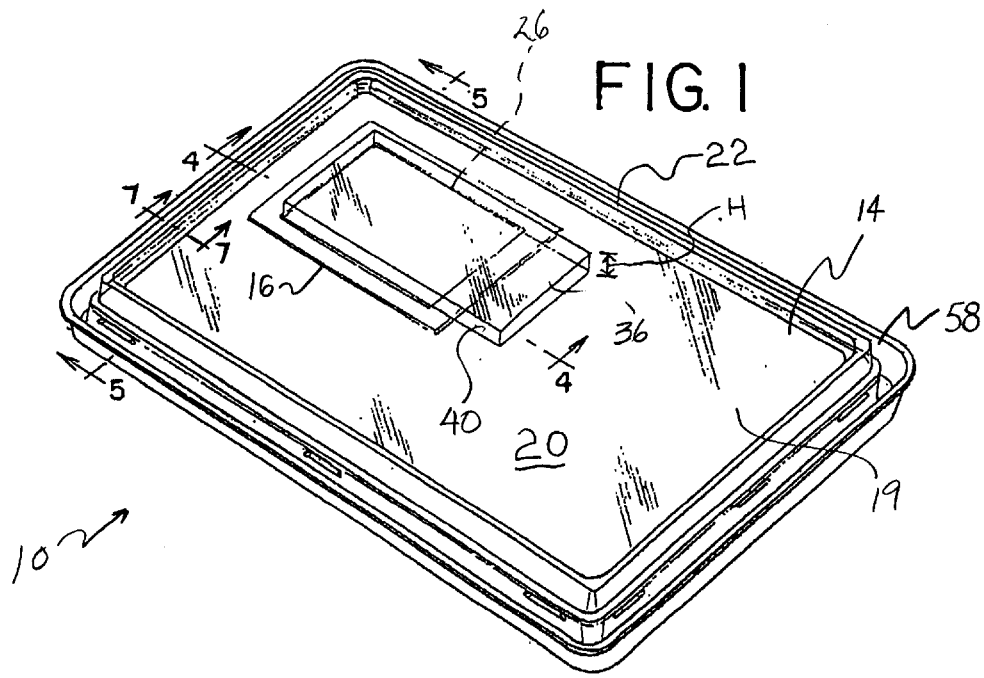
FIG. 1 is a front perspective view of the present antipilferage package.
Figure 2:
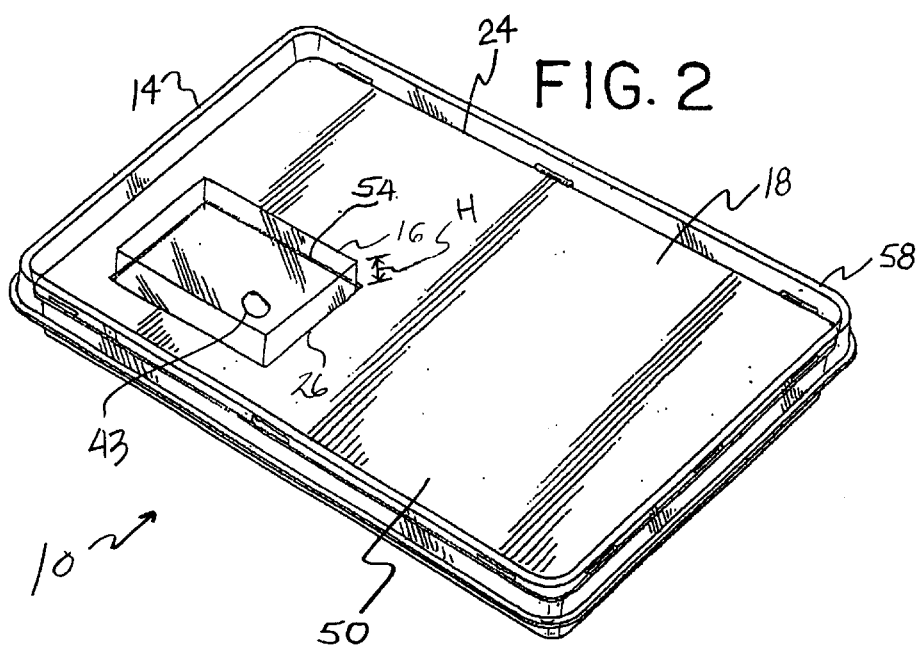
FIG. 2 is a back perspective view of the present antipilferage package.

Referring now to FIGS. 1–2 and 6, an antipilferage package is generally designated as 10 and holds an article 12 (shown in FIG. 6) in between a front portion 14 and a first blister 16 that is attached to a back portion 18. The front portion 14 has a sheet 19 generally defining a plane 20 and has an outer rim 22. An outer periphery 24 of the back portion 18 is configured to be secure to the front portion 14, and preferably to engage the outer rim 22. The back portion 18 also defines an inner opening 26 with an area 28 that is substantially smaller than an area 30 of the back portion. This difference in size provides a much larger item to conceal or shoplift compared to the article 12 without the package 10.

Referring not to FIG. 6, the first blister 16 is separately formed and is shaped for defining a first pocket 32 that is configured for receiving at least a portion of the article 12. The first blister 16 also has a height 'H' which extends generally normally relative to the back portion 18 and the plane 20. A peripheral edge 34 on the first blister 16 is preferably configured for attachment to the back portion 18 in a region of the inner opening 26 of the back portion. It will be appreciated, however, that the first blister 16 could be directly attached to the front portion 14 hear the region of the inner opening 26.

The front portion 14 preferably includes a second blister 36 that is integrally formed with the front portion 14 and defines a peripheral edge 38. The second blister 36 also defines a second pocket 40 shaped for receiving at least another portion of the article 12. Similar to the first blister 16, the second blister 36 has a height 'H' which extends generally normally relative to the front portion 14 of the package, preferably in the opposite direction that the first blister 16 extends. It will be appreciated that as an alternative, an article 12 may be held entirely by the first blister 16 and a front portion 14 without a blister. It will also be appreciated that the second blister 36 could also be made separately from the front portion 14.

Referring now to FIGS. 3–5 with the preferred configurations, the first and second blisters 16, 36 are disposed in facing relationship to each other to so that the first and second pockets 32, 40 are in communication with each other and with inner opening 26 to form a single enclosure 42. It will be appreciated that while the blisters 16, 36 completely enclose the article 12, the blisters may only partially enclose the article 10, especially when a hole 43 (FIG. 2) is provided in the pockets for access to buttons, switches or lights or other components (not shown) on the article that require access by the consumer before purchase.

Referring again to FIGS. 1 and 6, in the preferred embodiment, a front half 44 of the article 12 is held by the second blister 36 while a back half 46 of the article 12 is held by the first blister 16. Also in the preferred embodiment, however, the blisters 16, 36 are disposed in facing relationship to each other to be partially out of alignment so that an unsymmetrical portion 48 of the article 10 can extend between the back portion 18 and the front portion 14 while still maintaining that half of the article (44 or 46) be held by one of the blisters (16 or 36). This configuration preferably requires that the inner opening 26 be dimensioned generally coextensive with only one of the blisters (16 or 36) rather than both of them (best seen in FIG. 5).

Referring now to FIGS. 3–6, in another aspect of the present invention, the back portion 18 is made of a non-thermoformed material such as stiff cardboard or paper, while both the front portion 14 and the first blister 16 are made from thermoformable plastic. The first blister 16 is attached to the back portion 18 as described below for cooperatively defining a back 50 of the package 10. This eliminates the need for a second ply of thermoformable material that is the same as the front portion. The front portion 14 and the back 50 of the package are configured and disposed for cooperatively defining the enclosure 42 as well as an enclosed continuous space 52 (shown in FIG. 5A) between the front portion and the back of the package. The space 52 is preferably continuous with the first and second pockets 32, 40. The space 52 could be used to hold additional paper or inserts (not shown) for displaying product advertising or information rather than printing the information directly on the back portion 18.

Referring again to FIGS. 1, 2 and 4–6, the back portion 18 further includes an inner rim 54 defining the inner opening 26, and the peripheral edge 34 on the first blister 16 further includes a generally circumferential, outwardly extending flange 56 preferably integral with the inner rim 54. The flange 56 is securably disposed between the front portion 14 and the back portion 18. With this structure, the flange 56 is larger than the inner rim 54 of the inner opening 26 so that the first blister 16 cannot be pulled outwardly and away from the inner opening 26. The flange 56 also is preferably affixed to the back portion 18 by an adhesive or by heat sealing as is known in the art.

Referring now to FIG. 7, the outer rim 22 of the front portion 14 has a rib (sometimes called a flange or frame) 58 with an inner wall 60, a middle wall 62 and an outer wall 64. The inner wall 60 is integrally formed with the outer rim 22 and generally extends normally relative to the plane 20 defined by the front portion 14. The inner wall 60 also extends from the outer rim 22 in a first direction and to a generally pointed peak 66. At the peak 66, the middle wall 62 is integrally formed with the inner wall 60 and generally extends normally relative to the plane 20 from the peak 66 in a second direction, past the plane 20 and to a valley 68. The second direction is preferably generally opposite to the first direction.

In the valley 68, the outer wall 64 is integrally formed with the middle wall 62 and extends from the valley, generally normally relative to the plane 20, to a distal end 70 defining a top 72 of the outer wall 64. A generally radially or outwardly extending flange 74 is integrally formed with the top 72 of the outer wall 64 and is preferably generally coplanar with the plane 20.

All of the walls 60, 62, 64 are inclined so that the inner wall 60 and the middle wall 62 connect at the peak 66 preferably forming an inverted or convex, generally V-shaped formation 76. Similarly, the middle wall 62 and the outer wall 64 connect at the valley 68 forming an upright or concave, generally V-shaped formation 78.

Referring again to FIG. 7, the middle wall 62 includes a shoulder 80 which is generally parallel to the plane 20 and preferably disposed approximately at the mid-point of the height of the middle wall 62 so that the shoulder 80 is generally positioned coplanar with the plane 20. Between the shoulder 80 and the outer rim 22 of the front portion 14, the rib 58 further includes a concave space 82 defined beneath the peak 66 and also between the inner wall 60 and the middle wall 62. The back portion 18 is configured and disposed to directly attach to the shoulder 80, preferably by an adhesive, so that the back portion 18 preferably spans the space 82.

Also depicted in FIG. 7, the middle wall 62 has a number of protrusions 84 spaced around the rib 58 for retaining the outer periphery 24 of the back portion 18 in proximity to the front portion 14. The back portion is also preferably or alternatively affixed by adhesive or heat sealing to the front portion 14 along the shoulder 80 and outer rim 22 of the front portion. It will be appreciated that it is also possible for the protrusions to hold the back portion 18 in place without adhesive. The attachment of the non-thermoformed back portion 18 to the first blister 16 and to the front portion 14 eliminates the need of conventional antipilferage packages for connecting two thermoformed pieces to each other that also typically requires expensive RF sealing.

Referring now to FIGS. 8–11, in another aspect of the present invention, to form the front portion 14 of the package 10, a sheet of thermoformable material 100, preferably provided in rolls, is positioned in a mold set 98 between two parts, a first part 102 and a corresponding second part 104. Each part 102, 104 also has at least a male portion 106 with an insert 94 and at least a female portion 108 with a cavity 96. Preferably, on the first part 102, the female portion 108 is a lower female portion assist 108*a* and the male portion 106 is a lower male portion mold 106*a*. Similarly, on the second part 104, the female portion 108 is an upper female portion assist 108b and the male portion 106 is an upper male portion mold 106b.

With this configuration, when the sheet 100 is placed in the mold set 98, the sheet is placed over the lower female portion assist 108a and the lower male portion mold 106a, and under the upper female portion assist 108b that is configured and disposed to matingly register with the lower male portion mold 106a, and under the upper male portion mold 106b that is configured and disposed to matingly register with the lower female portion assist 108a.

The male and female portions 106, 108 are also positioned so that the first part 102 and the second part 104 cooperatively define at least two thermoforming chambers 110, 112 (shown in FIG. 9) connected by a passage 114 between the first part and the second part. A first region 116 between the upper female portion assist 108b and the lower male portion mold 106a define one of the at least two thermoforming chambers, chamber 110, and a second region 118 between the upper male portion mold 106b and the lower female portion assist 108a define the other chamber 112.

Figure 9:
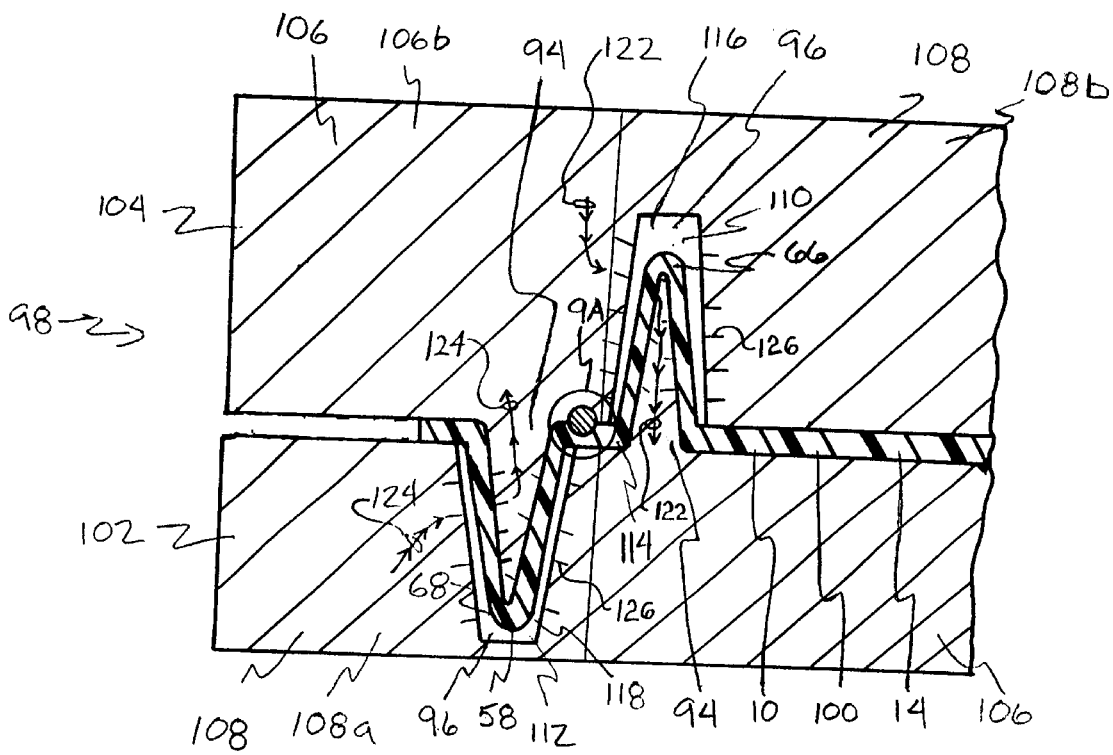
FIG. 9 is a greatly simplified cross-sectional view of molds and assists enclosed on a sheet used to form a portion of the present antipilferage package.

As best seen in FIGS. 9–11, the thermoforming chamber 110 tapers in a different, and preferably opposite, direction than the other thermoforming chamber 112. Chamber 110 is preferably tapered convexly to form the peak 66 and the chamber 112 is preferably tapered concavely to form the valley 68. The passage 114 is shaped to form the shoulder 80.

Once the sheet 100 is in position between the parts 102, 104, the first part 102 is converged onto the second part 104 in the presence of heat for enclosing the chambers 110, 112 and shaping or bending the sheet into the generally desired shape with a peak 66, valley 68, and shoulder 80. In more detail, the converging step includes converging the upper female portion assist 108b with the lower male portion mold 106a and converging the upper male portion mold 106b with the lower female portion assist 108a for forming the rib 58. While in the preferred embodiment the first part 102 is positioned below the second part 104, it will be appreciated that the parts may be configured in a side-by-side relationship instead.

Figure 9A:
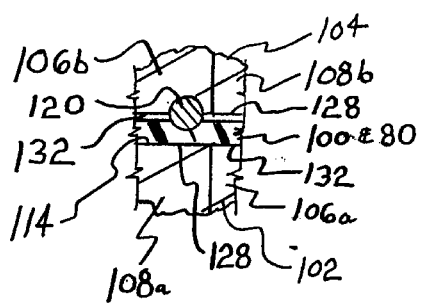
FIG. 9A is a close up view of a portion of the cross-section of FIG. 9.

Additionally, the converging of the parts 102, 104 includes sandwiching a chamber sealing device 120 (best seen in FIG. 9A) and the thermoformable sheet 100 between the first part 102 and the second part 104 along the passage 114 so that air cannot flow through the passage, which isolates the thermoforming chamber 110 from the thermoforming chamber 112. The configuration and pneumatic isolation of the chambers 110, 112 allows for unique airflow in each chamber depending on the position of the male portion molds 106. This results in a uniform thickness throughout the rib 58, which permits the formation of sharp corners at the tips (or peaks 66 and valleys 68) of the V-shaped formations 76, 78 (best seen in FIG. 9). The sharper the tips, the stronger the rib 58 will be.

The chamber sealing device 120 is preferably a rubber O-ring that may cause an indent (not shown) on the shoulder 80. Any indent formed, however, will be covered by back portion 18 and may even be filled with adhesive. As such, it probably will not be visible in the end package.

The chamber sealing device 120 is disposed along the passage 114, which generally forms a point 121 where the upright and the inverted V-shaped formations 76, 78 will meet. The shoulder 80 is also formed by the passage 114 generally at the same point 121 and is shaped to be generally coplanar to plane 20, which is defined by a portion of the sheet 100 or front portion 14 that is not a part of the rib 26.

Referring again to FIGS. 8–9, the passage 114 is formed by providing the female portion assists 108 with a generally planar surface 128 facing the corresponding male portion mold 106, which also has cavity 96 defined by walls 130 extending generally normally to the planar surface 128. The male portion molds 106 are provided with a generally planar surface 132 facing the corresponding female portion assist 108 and having insert 94 having walls 134 generally extending normally to the planar surface 132. Each planar surface 128 on the female assist portions 108 aligns with an adjacent planar surface 132 of the male portion molds 106. The aligned planar surfaces 128, 132 define the forms or molds for the passage 114.

Next as shown in FIG. 9, the sheet is shaped by maintaining air flow (arrows) against the sheet in at least a first direction 122 in one thermoforming chamber 110 and in a second direction 124 in the other thermoforming chamber 112 where the first direction 122 is different, and preferably opposite, to the second direction 124. Maintaining the air flow includes injecting air pressure and creating a vacuum in the first direction 122 in the first chamber 110 and in the second direction 124 in the second chamber 112 by preferably using an airflow device such as tiny apertures 126 located on the inserts 94 on the male portions 106 and on the cavities 96 in the female portions 108 for entry and exit ways for the air. The mechanisms for providing air pressure to, and vacuum from, the apertures 126 are known in the art.

The air pressure and vacuum move the sheet 100 away from the female portion assists 108 and against the male portion molds 106 to form the exact desired cross section with the generally inverted V-shaped formation 76 continuous with a generally upright V-shaped formation 78. This can be accomplished even though the male portions molds 106 extend in opposite directions because the chambers 110, 112 are isolated from each other for efficient control of the air flow.

Referring again to FIG. 6, the resulting formed front portion 14 is then moved to a packaging area where the article 12 is placed on the front portion. Then, the first blister 16 is attached to the back portion 18 to form the back of the package 50, which is then placed over the article 12 and the front portion 14. The back portion 18 is then attached to the front portion 14 to complete the package.

It will be appreciated that other shapes for the rib that require two isolated chambers to form a single sheet or ply of material are still within the scope of the present invention, such as configurations that add more walls to the rib or extend the walls 60, 62 and 64 in different directions.

Thus, the present antipilferage package 10, method for making the package 10 and the apparatus for making the package 10 provide several features designed to address the particular problems of store display packaging that is simultaneously inexpensive while providing anti-theft features. These features include a non-thermoformable back portion 18 to attach to a first blister 16 and thermoformed front portion 14 instead of using an expensive second ply of thermoformable material. Furthermore, a rib 58 is formed from a single ply or sheet 100 with V-shaped formations 76, 78 defining both peaks 66 and valleys 68 that eliminate the need for a second ply of thermoformable material while maintaining the unbendability and strength of the rib 58. This is accomplished by using a chamber sealing device 120 to isolate chambers 110, 112 used to form the different peaks 66 and valleys 68.

While a particular embodiment of the present antipilferage package has been shown and described, it will be appreciated by those skilled in the art that changes and modifications may be made thereto without departing from the invention in its broader aspects and as set forth in the following claims.

What is claimed is:

1. A package for holding an article, comprising:
   a front portion having a sheet and having an outer rim;
   a back portion having an area and an outer periphery, and being configured to be secured to said front portion, said back portion defining an inner opening having an area substantially smaller than said area of said back portion;
   a separately formed first blister shaped for defining a first pocket configured for receiving at least a portion of the article, said first blister having a peripheral edge configured for attachment to at least one of said front portion and said back portion in a region of said inner opening of said back portion; and
   said front portion further includes an integrally formed second blister having a peripheral edge and defining a second pocket shaped for receiving at least a portion of the article.

2. The package of claim 1, wherein said back portion is a sheet of non-thermoformed material.

3. The package of claim 1, wherein said first blister has a height extending generally normally relative to said back portion of the package.

4. The package of claim 1, wherein said second blister has a height extending generally normally relative to said front portion of the package.

5. The package of claim 1, wherein said first and second blisters are disposed in facing relationship to each other to be partially out of alignment.

6. The package of claim 5, wherein said inner opening is dimensioned to be generally coextensive with only one of said blisters.

7. The package of claim 1, wherein said first blister is attached to said back portion for cooperatively defining a back of the package, and wherein said front portion, and said back of the package are configured and disposed for cooperatively defining an enclosed continuous space between the front portion and the back of the package.

8. A package for holding an article, comprising:
   a front portion having a sheet generally defining a plane and having an outer rim;
   a back portion having an area and an outer periphery, and being configured to be secured to said front portion, said back portion defining an inner opening having an area substantially smaller than said area of said back portion;
   a separately formed first blister shaped for defining a first pocket configured for receiving at least a portion of the article, said first blister having a peripheral edge configured for attachment to at least one of said front portion and said back portion in a region of said inner opening of said back portion;
   said back portion further includes an inner rim defining said inner opening, and wherein said peripheral edge of said first blister further includes a generally circumferential, outwardly extending flange engaging said inner rim of said inner opening and disposed between said front portion and said back portion, wherein said flange is secured between said front portion and said back portion so that said first blister cannot be pulled outwardly and away from said opening in said back portion.

9. A package comprising:
   a sheet generally defining a plane and having an outer rim with a rib, said rib including:
      an inner wall integrally formed with said outer rim, extending generally normally relative to said plane and extending from said outer rim in a first direction to form a peak;
      a middle wall integrally formed with said inner wall, extending generally normally relative to said plane and extending from said peak in a second direction, to a valley, said second direction being generally opposite to said first direction;
      an outer wall integrally formed with said middle wall, extending generally normally relative to said plane, and extending from said valley to a distal end defining a top of said outer wall; and
      said middle wall includes a shoulder which is generally parallel to said plane of said front portion.

10. A package for holding an article, comprising:
    a front portion having a sheet generally defining a plane and having an outer rim;
    a back portion having an area and an outer periphery, and being configured to be secured to said front portion, said back portion defining an inner opening having an area substantially smaller than said area of said back portion;
    a separately formed first blister shaped for defining a first pocket configured for receiving at least a portion of the article, said first blister having a peripheral edge configured for attachment to at least one of said front portion and said back portion in a region of said inner opening of said back portion; and
    a rib, said rib including:
       an inner wall integrally formed with said outer rim, generally extending normally relative to said plane and extending from said outer rim in a first direction and to a peak;
       a middle wall integrally formed with said inner wall, generally extending normally relative to said plane and extending from said peak in a second direction, past said plane and to a valley, said second direction being generally opposite to said first direction;
       an outer wall integrally formed with said middle wall, extending generally normally relative to said plane, and extending from said valley to a distal end defining a top of said outer wall; and
       wherein said middle wall includes a shoulder which is generally parallel to said plane of said front portion.

11. The package of claim 8, wherein said flange of said first blister is affixed to said back portion.

12. The package of claim 1, wherein said outer rim of said front portion further includes a wall configured with at least one protrusion for retaining said outer periphery of said back portion in proximity to said front portion.

13. The package of claim 1, wherein at least a part of said back portion is directly affixed to said front portion by an adhesive.

14. The package according to claim 10, wherein said walls are inclined so that said inner wall and said middle wall connect at said peak forming an inverted generally V-shaped formation, and said middle wall and said outer wall connect at said valley forming an upright generally V-shaped formation.

15. The package according to claim 10, wherein said shoulder is positioned on said middle wall approximately at the mid-point of the height of said middle wall so that said shoulder is generally positioned coplanar with said plate.

16. The package according to claim 10, wherein said rib further includes a space defined beneath said peak and between said inner wall and said middle wall, and wherein said back portion is configured and disposed to directly attach to said shoulder of said middle wall so that said back portion spans said space.

17. The package according to claim 10, further including a radially extending flange integrally formed with said top of said outer wall and generally coplanar with said plane.

18. A package comprising:

a back portion;

a sheet generally defining a plane and having an outer rim with a rib, said rib including:
- an inner wall integrally formed with said outer rim, extending generally normally relative to said plane and extending from said outer rim in a first direction to form a peak;
- a middle wall integrally formed with said inner wall, extending generally normally relative to said plane and extending from said peak in a second direction, to a valley, said second direction being generally opposite to said first direction;
- an outer wall integrally formed with said middle wall, extending generally normally relative to said plane, and extending from said valley to a distal end defining a top of said outer wall; and
- said rib further includes a space defined beneath said peak and between said inner wall and said middle wall, and wherein said back portion is configured and disposed to directly attach to a shoulder of said middle wall so that said back portion spans said space defined by said rib.

19. The package according to claim 9, wherein said walls are slightly inclined so that said inner wall and said middle wall connect at said peak forming an inverted generally V-shaped formation and said middle wall and said second wall connect at said valley forming an upright generally V-shaped formation.

20. The package according to claim 9, wherein said middle wall further extends in said second direction from said peak and past said plane to said valley and wherein said shoulder is positioned on said middle wall approximately at the mid-point of the height of said middle wall so that said shoulder is generally positioned coplanar with said plane.

21. The package according to claim 18 wherein said package further includes a radially extending flange integrally formed with said top of said outer wall and generally lying coplanar with said plane.

22. A package for holding an article, comprising:

a front portion having a sheet generally defining a plane and having an outer rim;

a back portion having an area and an outer periphery, and being configured so that said outer periphery engages said outer rim of said front portion, said back portion defining an inner opening with an area substantially smaller than said area of said back portion;

a separately formed first blister shaped for defining a first pocket configured for receiving at least a portion of the article, said first blister having a peripheral edge configured for attachment to said back portion in a region of said inner opening of said back portion; and a rib including:
- an inner wall integrally formed with said outer rim, extending generally normally relative to said plane and extending from said outer rim in a first direction and to a peak;
- a middle wall integrally formed with said inner wall, extending generally normally relative to said plane and extending from said peak in a second direction, past said plane and to a valley, said second direction being generally opposite to said first direction; and
- an outer wall integrally formed with said middle wall, extending generally normally relative to said plane, and extending from said valley to a distal end defining a top of said outer wall.

23. A package for holding an article, comprising:

a front portion composed of thermoformable material and having a sheet generally defining a plane, a product cavity defined by said sheet, and said sheet having an outer rim;

a back portion composed of non-thermoformable material and having an area and an outer periphery, and being configured to be secured to said front portion wherein said back portion at least partially defines a rear surface of the package;

a rib on said outer rim configured to define a reinforcing structure;

a separately formed blister having at least a portion disposed between said front portion and said back portion, and a secured second blister integrally formed with said front portion, at least a portion of said first and second blisters being configured to receive at least a portion of the article.

24. A package for holding an article, comprising:

a front portion having a sheet generally defining a plane and having an outer rim;

a back portion having an area and an outer periphery, and being configured to be secured to said front portion, said back portion defining an inner opening having an area substantially smaller than said area of said back portion;

a separately formed first blister shaped for defining a first pocket configured for receiving at least a portion of the article, said first blister having a peripheral edge configured for attachment to at least one of said front portion and said back portion in a region of said inner opening of said back portion;

said front portion further includes a second blister having a peripheral edge and defining a second pocket shaped for receiving at least a portion of the article;

said second blister has a height extending generally normally relative to said front portion of the package; and said second blister is integrally formed with said front portion.

25. A package for holding an article, comprising:

a front portion having a sheet generally defining a plane;

a back portion generally defining a plane and having an opening;

a rim formed at a periphery of said front portion, said rim comprising a first structure extending from said front portion in a first direction generally normal to said front portion, a second structure extending in a second direction generally normal to said front portion and generally opposite to said first direction;

a separately formed first blister at least partially disposed between said front portion and said back portion, said first blister being shaped for defining a pocket configured for receiving at least a portion of the article; and said back portion engages at least a portion of said rim to at least partially secure said back portion to said front portion.

26. The package of claim 25 wherein said rim is integrally formed with said front portion.

27. The package of claim 25 wherein said first structure extends from said periphery of said front portion.

28. The package of claim 27 wherein said second structure extends from a periphery of said first structure.

29. The package of claim 25 wherein said back portion engages at least one of said first structure and said second structure.

30. The package of claim 27 further comprising a shoulder portion integrally formed with said first structure and disposed between said first and second structures, wherein said shoulder extends from a periphery of said first structure and said second structure extends from a periphery of said shoulder.

31. The package of claim 30 wherein said back portion engages at least one of said shoulder, said first structure, and said second structure.

32. The package of claim 25 wherein said back portion engages at least a portion of said second structure.

33. The package of claim 31 wherein said back portion is adhered to said shoulder.

34. The package of claim 32 wherein said second structure further comprises at least one protrusion for engaging a peripheral portion of said back portion.

35. A package for holding an article, comprising:

a front portion having a sheet generally defining a plane;

a back portion generally defining a plane;

a rim formed at a periphery of said front portion, said rim comprising a first structure extending from said front portion in a first direction generally normal to said front portion, a second structure extending in a second direction generally normal to said front portion and generally opposite to said first direction, and a shoulder portion integrally formed with said first structure and disposed between said first and second structures, wherein said shoulder extends from a periphery of said first structure and said second structure extends from a periphery of said shoulder; and at least one blister extending normally from at least one of said front portion and said back portion, said at least one blister being shaped for defining a pocket configured for receiving at least a portion of the article;

wherein said back portion engages at least a part of said shoulder.

36. A package for holding an article, comprising:

a front portion having a sheet generally defining a plane;

a back portion generally defining a plane;

a rim formed at a periphery of said front portion, said rim comprising a first structure extending from said front portion in a first direction generally normal to said front portion, a second structure extending in a second direction generally normal to said front portion and generally opposite to said first direction, and a shoulder portion generally coplanar with said plane of said front portion, said shoulder portion being disposed between said first and second structures, wherein said shoulder extends from a periphery of said first structure and said second structure extends from a periphery of said shoulder; and at least one blister extending normally from at least one of said front portion and said back portion, said at least one blister being shaped for defining a pocket configured for receiving at least a portion of the article;

wherein said back portion engages at least a portion of said rim to at least partially secure said back portion to said front portion.

* * * * *

UNITED STATES PATENT AND TRADEMARK OFFICE
CERTIFICATE OF CORRECTION

PATENT NO. : 6,719,139 B1
DATED : April 13, 2004
INVENTOR(S) : Douglas E. Foos et al.

It is certified that error appears in the above-identified patent and that said Letters Patent is hereby corrected as shown below:

<u>Column 12,</u>
Line 22, insert -- "first" -- before "blister".

Signed and Sealed this

Eighteenth Day of October, 2005

JON W. DUDAS
*Director of the United States Patent and Trademark Office*